Nov. 5, 1963 J. P. SHUBA 3,109,990
RING COUNTER WITH UNIQUE GATING FOR SELF CORRECTION
Filed Sept. 7, 1961

*INVENTOR.*
JOSEPH P. SHUBA
*BY* [signature]
ATTY.

United States Patent Office 3,109,990
Patented Nov. 5, 1963

3,109,990
RING COUNTER WITH UNIQUE GATING FOR SELF CORRECTION

Joseph Patrick Shuba, Joliet, Ill., assignor to Automatic Electric Laboratories, Inc., Northlake, Ill., a corporation of Delaware Filed Sept. 7, 1961, Ser. No. 136,648
2 Claims. (Cl. 328—43)

This invention relates to ring counter and more particularly to a ring counter with a unique gating arrangement for self-correction.

In many digital systems there is a need for a shift register, ring counter, or binary counter with associated gates, to provide a pulse on each of a number of output leads in succession. For example, in memory applications it is desirable to select rows in a memory sequentially. It is also desired to have this shift register be self-correcting. By this it is meant that if at any time two outputs were "true" one being set due to noise present, or slight power failure, the system will correct itself automatically.

For the purposes of this description a positive voltage level on the 1 output lead of a flip flop is considered a "true" output while when an output at a reference level below the "true" output appears on the 0 lead of a flip flop the register is considered "off." Therefore it is an object of this invention to provide a shift register that will in case of error due to noise, slight power failure or other cause automatically correct itself within a definite number of pulses.

A feature of this invention is the use of an "and" gate and a flip flop circuit to provide means of automatically correcting errors which occur in a shift register.

In a typical ring counter or binary counter with associated gating circuits having a pulse appear successively on a number of output leads, the output is supposed to appear on only one lead at any time. That is, only one output lead is to be "true" at any one time, the other flip flops must be "off." If two or more outputs are "true" simultaneously there is an error in the register.

If the ring counter is of the type described above and no provision is made for eliminating errors, an extra pulse appearing at the input to the counter due to noise or a pulse appearing in the counter due to slight power failure will be propagated around the circuit indefinitely thus making proper operation impossible.

According to the principles of this invention an "and" gate and an extra flip flop circuit may be arranged with the counting circuit in order that error pulses cannot be propagated around the circuit.

The objects and features of this invention will become more clear and other embodiments will become obvious upon reference to the following description and drawings in which.

Figure 1:
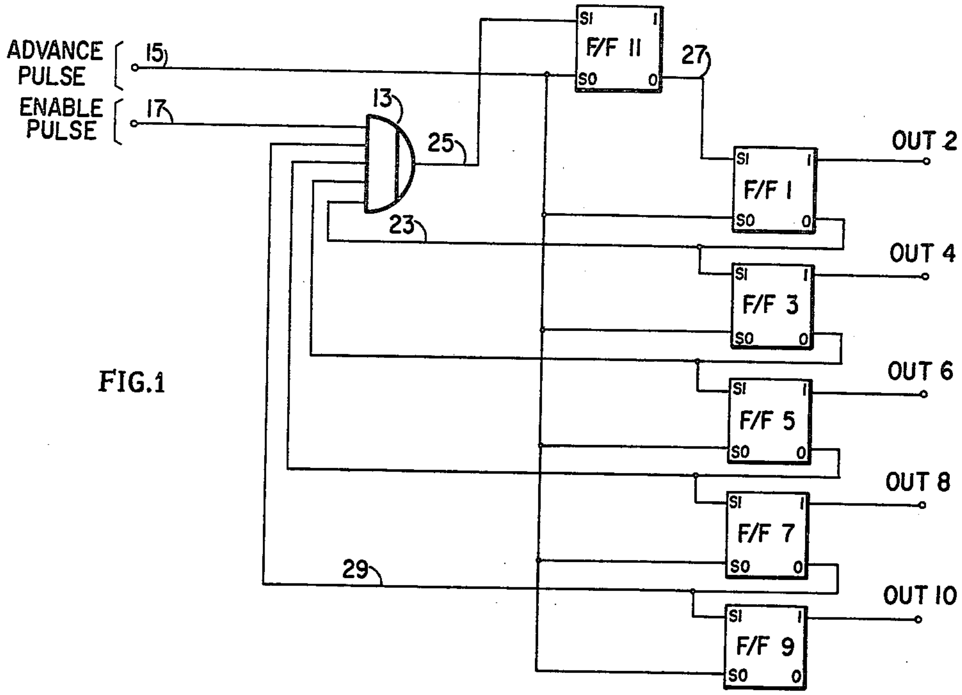
FIG. 1 is an embodiment of the invention.

The circuit of FIG. 1 comprises flip flop circuits 1, 3, 5, 7, 9 and 11, "and" gate 13, advance pulse input 15 and enable pulse input 17.

Figure 2:
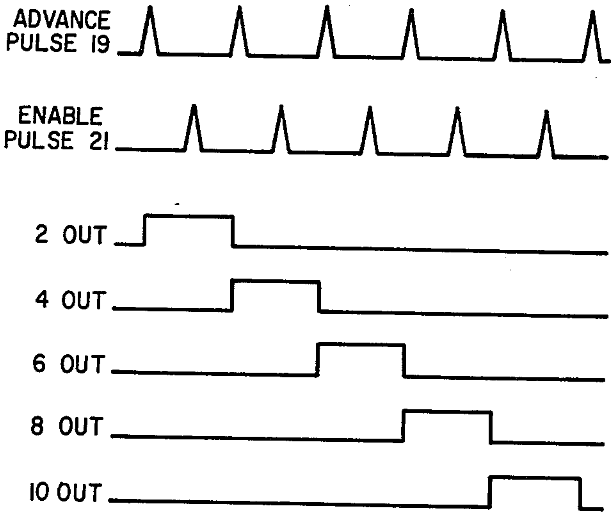
FIG. 2 is a chart showing the relation of the various pulses which occur in the circuit.

FIG. 2 shows advance pulses 19, enable pulses 21 and the output pulses respectively 2, 4, 6, 8 and 10 of flip flop circuits 1, 3, 5, 7 and 9.

Under normal conditions with a "true" output from flip flop 1 there would be an "off" output from the other flip flops 3, 5, 7 and 9. If these conditions existed and an advance pulse 19 occurred all of the flip flops in the "true" state would be switched to the "off" state and those in the "off" state would remain unaffected. So in this case flip flop 1 would switch to the "off" state and flip flops 3, 5, 7 and 9 would be unaffected. The switching of flip flop 1 from "true" to "off" produces a pulse on lead 23 which in turn causes flip flop 3 to switch to the "true" state. Thus the true output has shifted from flip flop 1 to flip flop 3. As more advance pulses occur the "true" output will move step by step to flip flop 9. When this occurs all of the inputs from the flip flops to "and" gate 13 will be "true" indicating that the counters are in the "off" state and when an enable pulse 19 occurs, an output pulse will occur on lead 25 which will switch flip flop 11 from "off" to "true." The next enable pulse that occurs will switch flip flop 11 to "off" thus causing a pulse on lead 27 which will switch flip flop 1 to the "true" state thus completing one loop of the register.

It should be noted that all of the flip flops 1, 3, 5, 7 and 9 must be in the "off" state at the time an enable pulse occurs in order to switch flip flop 1 to the "true" state.

Thus if an error occurs in the counter, that is if two or more of the flip flops are in the "true" state simultaneously the cycle will not begin again until the error pulse is shifted out of the counter. To do this a maximum of four advance pulses is required. So if both flip flops 1 and 3 are "true" at the same time they will both be shifted along the counter until only the flip flops 7 and 9 are "true." On the next enable pulse there will be no output on lead 25 and thus flip flop 11 will not switch because lead 29 is still "off." The next pulse will shift the error out the counter and normal operation as described above will follow.

A typical flip-flop circuit is shown in Digital Computer Components and Circuits, R. K. Richards, D. Van Nostrand Company, pp. 160–163 (1957). A typical AND gate is shown at pp. 37–39 in the same book.

While I have described this invention in terms of a single embodiment it is to be clearly understood that other embodiments are possible and is not limited to this description.

What is claimed is:

1. A ring counter comprising a plurality of bistable devices each having a first and a second stable state with a first and a second input and a first and a second output;
   a control bistable device having a first and a second stable state with a first and second input and a first and a second output, a first source of recurring pulses connected to the second input of the control bistable device and the second inputs of each of the bistable devices of said plurality, a connection from the first output of the control bistable device to the first input of the first bistable device of said plurality;
   a coincidence gating means, a second source of recurring pulses connected to one input of the gating means, connections from the second output of each of the bistable devices except the last bistable device to the first input of the succeeding bistable device and to the remaining inputs of the gating means;
   a connection from the output of the gating means to the first input of the control bistable device to set the control bistable device to the first stable state only in response to the plurality of bistable devices except the last bistable device being in the second stable state, whereby any error in the counter is eliminated within one cycle of the counter.

2. In a ring counter comprising a plurality of bistable devices as claimed in claim 1, wherein said bistable devices comprise transistor flip-flops and said coincidence gating means comprises an AND gate, and wherein pulses from said two sources occur alternately.

References Cited in the file of this patent

UNITED STATES PATENTS

| | | |
|---|---|---|
| 2,853,238 | Johnson | Sept. 23, 1958 |
| 3,020,481 | Hulst | Feb. 6, 1962 |